May 5, 1970     R. KIRKAMP ET AL     3,509,800
PORTABLE GROUND COVER FOR STARTING AND LANDING SURFACES
FOR VERTICALLY AND SHORT-STARTING
AND LANDING VEHICLES

Filed Dec. 4, 1967     4 Sheets-Sheet 1

Inventors:
Rolf Kirkamp
Hartmut Klein
Hans Peter Rössner

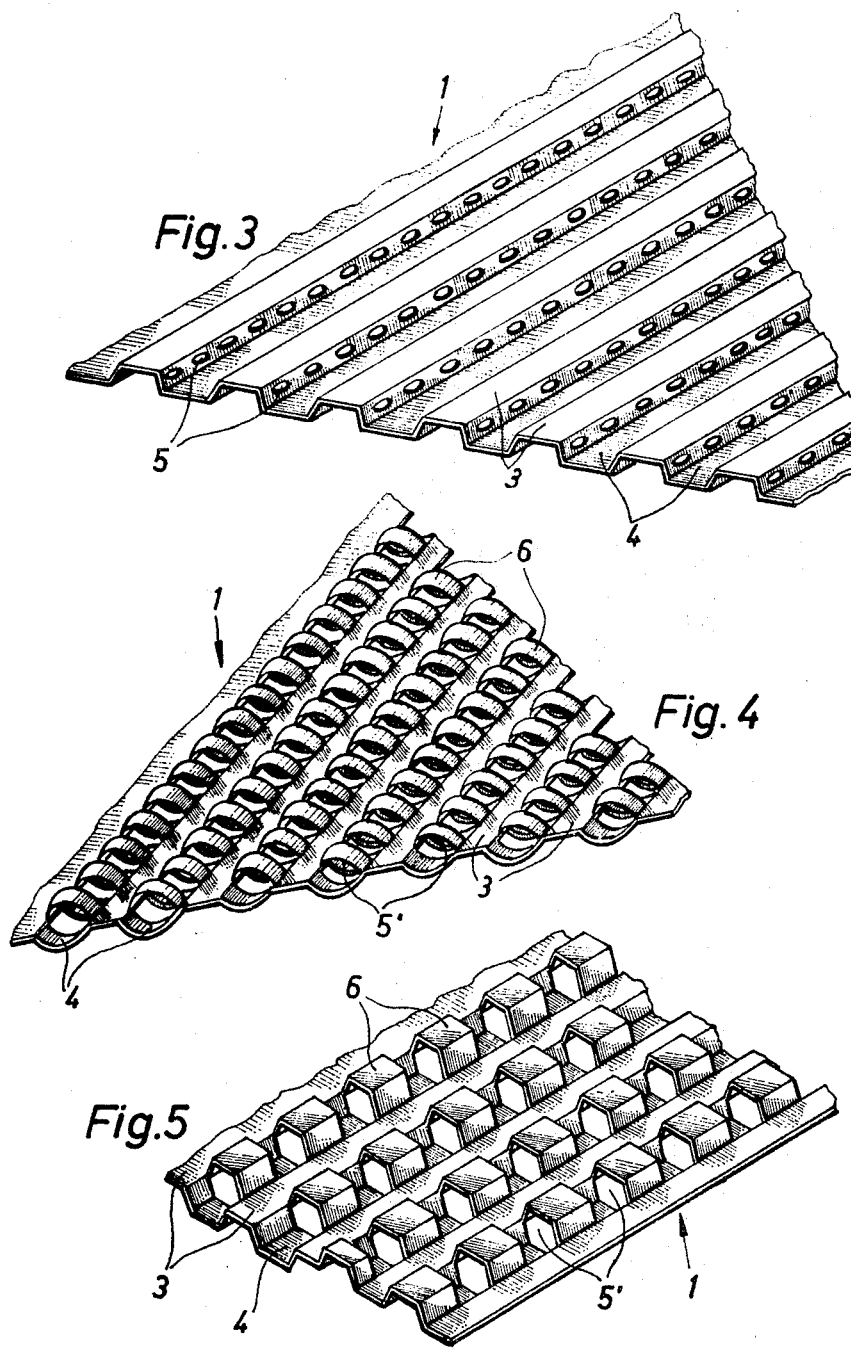

Inventors
Rolf Kirkamp
Hartmut Klein
Hans Peter Hessner

May 5, 1970   R. KIRKAMP ET AL   3,509,800
PORTABLE GROUND COVER FOR STARTING AND LANDING SURFACES
FOR VERTICALLY AND SHORT-STARTING
AND LANDING VEHICLES
Filed Dec. 4, 1967   4 Sheets-Sheet 4

Inventor:
Rolf Kirkamp
Hartmut Klein
Hans Peter Rössner
By

United States Patent Office 3,509,800
Patented May 5, 1970

3,509,800
PORTABLE GROUND COVER FOR STARTING AND LANDING SURFACES FOR VERTICALLY AND SHORT-STARTING AND LANDING VEHICLES
Rolf Kirkamp, Dreyer, Hartmut Klein, Bremen-Lesum, and Hans Peter Rossner, Speyer, Germany, assignors to Vereinigte Flugtechnische Werke G.m.b.H. Fruhr "Weser" Flugzeugbau Focke-Wulf Heinkel-Flugzeugbau, Bremen, Germany
Filed Dec. 4, 1967, Ser. No. 687,821
Claims priority, application Germany, Dec. 5, 1966, V 32,490; Aug. 17, 1967, V 34,264
Int. Cl. E01c 5/00
U.S. Cl. 94—13          11 Claims

ABSTRACT OF THE DISCLOSURE

Portable ground cover means composed of sections for starting and landing strips for short take-off and landing, in which the said sections have elevations and depressions so as to form a corrugated surface while passage means are provided which establish communication between the top and bottom surfaces of said sections to equalize the pressure on said top and bottom surfaces, said surfaces being of polygonal shape and so arranged with regard to each other as to form junctions at which said sections are interconnected.

---

The present invention relates to a portable ground cover adapted to be composed of individual sections for starting and landing surfaces of air vehicles adapted either to start from and land on short runways or to start and land vertically. Ground covers of this type must, for military and economical reasons be adapted to be built up and withdrawn quickly without requiring skilled workers. Furthermore, the finish-placed cover must be able to adapt itself to a roughly levelled natural ground. Another requirement to be met by such ground covers consists in that such ground covers will, under the influence of airplanes with jet propulsion or helicopter drive, not cause any ground erosion in view of the high kinematic and thermal energy of the jets. Such ground erosion will on one hand destroy the landing field and on the other hand represents a danger for the airplane, ground equipment and ground personnel by flying objects thrown into the air from the ground being eroded. Finally, eroded parts might pass into the driving inlet and affect the engines. It is also to be understood that the ground cover, in addition to having a high temperature resistance, must also have a high adhesion to the ground since otherwise, as practice has proved, the ground cover may lift itself from the ground under the influence of the jets and might even float away.

A ground cover composed of individual plates for a starting and landing area, which cover meets all the above-mentioned requirements, has not become known prior to the present invention. While it is known to compose individual plates by marginal grooves and keys, such an arrangement, in spite of the interengagement of the marginal areas, is not sufficient to seal the gaps against the high pressure of a driving jet vertically directed thereupon. It is also known to collect in passages the gases which pass through the gaps between the plates, in order to convey the thus caught gases to the marginal area of the starting and landing area. The plates are supported by expensive structural elements forming passages and lying on the ground. This arrangement of the individual plates can be employed only on level ground, and the plates have to be aligned. The outer marginal areas of these known covers are anchored in the ground.

It is, therefore, an object of the present invention to provide a portable ground cover for a starting and landing area which will meet the above-mentioned requirements while eliminating the drawbacks of heretofore known arrangements of the general type involved.

This object and other objects and advantages of the invention will appear more clearly from the following specification in connection with the accompaying drawings, in which:

FIG. 1 diagrammatically illustrates a starting and landing area composed of triangular plates;

FIG. 3 illustrates a corrugated plate with perforations for use as ground cover, in conformity with the present invention;

FIGS. 4–6 illustrate modified corrugated plates according to the invention with pressed-out portions;

Figure 1:
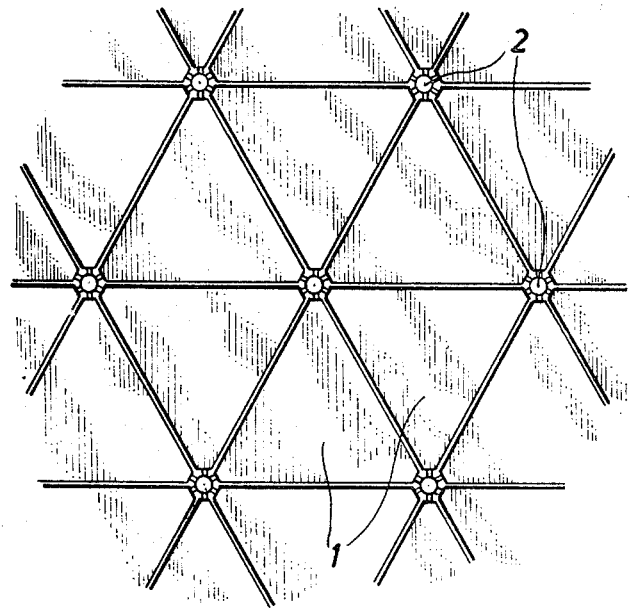

A portable ground cover according to the present invention is characterized primarily in that the cover sections are relief-shaped and are provided with perforations interconnecting the top and bottom side, while the axial directions of said perforations are preferably parallel to the extension of the plane of the ground cover. The invention is furthermore characterized in that the ground cover sections are at their nodal points or junctions interconnected in a force-locking manner.

In order to obtain a simple fundamental structure of the ground cover, the cover sections are advantageously designed in the form of undulated profiled plates having raised and depressed surfaces. The undulated form of the plate profile is expediently formed from adjacent circular, trapezoidal, rectangular, triangular, or similar shapes or of any desired combination of such forms.

Advantageously, adjacent crests and valleys formed by the elevations and depressions of the plate profile have different shapes.

The perforations which are intended to permit a pressure equalization between the top and the bottom side of the plate and which conduct away the impacting jets of the driving mechanism are arranged between crest and valley. Consequently, these perforations are not directly impacted upon by the jets.

If the plates, according to a further embodiment, comprise bridge-shaped pressed-down portions, they are advantageously arranged in the valleys and in the crests.

In order to avoid any material weakening of the individual plates by the bridge-shaped depressions, the said depressions are in adjacent valleys and crests offset with regard to each other.

According to a further embodiment of the ground cover according to the invention, the cover sections consist of meander-shaped adjacent bars or strips offset with regard to each other while bars or strips perpendicular to the longitudinal extension of said meander-shaped bars are passed through the openings of said meander-shaped bars in a direction perpendicular to the longitudinal direction of said meander-shaped bars, similar to the wefts and warps of a fabric. This assures a simple build-up and a particularly economical manufacture of the cover sections.

For purposes of intensifying the elimination of the occurring jet energy as well as for the deviation or deflection of the jets, it is advantageous with this embodiment of the cover sections to give the bars or strips a rectangular cross-section.

The individual cover sections, in order to assure a fast assembly or disassembly of the cover layer, must be easily movable. Therefore, they consist preferably of lightweight glass fiber reinforced synthetic material. Such synthetic material may, for instance, be polyester resin mixtures, phenol resins, silicon resins, or buton resins.

The connection between the individual cover sections is effected by connector means having interengaging connector elements such as hooks, ears, or similar elements which are easy to handle and to be connected to the cover sections. These hooks, ears, or the like are adapted by means of a connecting member provided with corresponding parts, to be connected to each other by turning said connecting member. The connecting member advantageously consists of a basic disc with a central bore, and of a cover disc rotatably journalled in said bore and resting upon the base disc. According to a further embodiment of the invention, the cover disc of the connecting member has a centrally arranged profiled passage for inserting a tool as, for instance, an earth anchor. When employing an earth anchor, the upper portion of the anchor can be inserted into the passage of the rotatable disc to form a safety means against turning.

Figure 2:
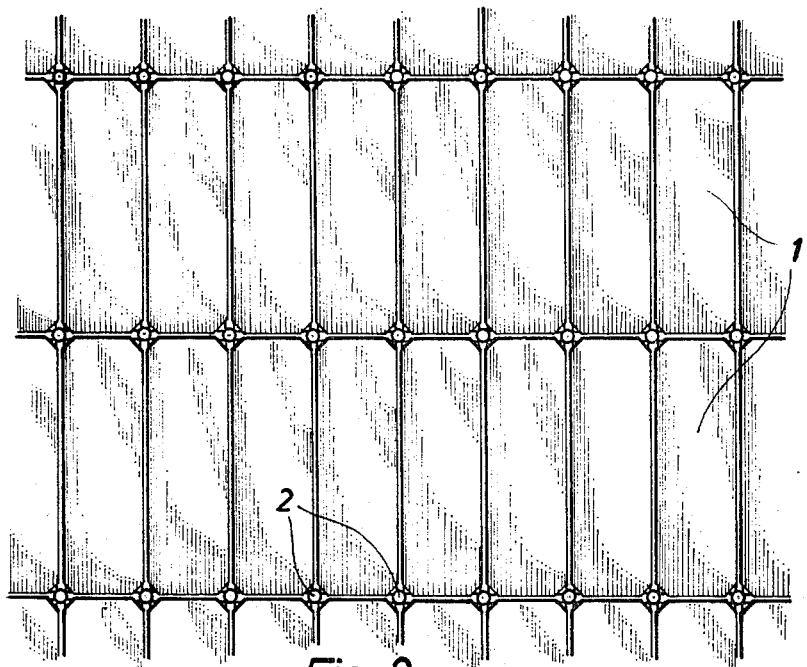
FIG. 2 is a landing area similar to FIG. 1 but built up with rectangular plates.

Referring now to the drawings in detail, and FIGS. 1 and 2 thereof in particular, the elements 1 and 2 form sections of a starting and landing cover area. According to FIG. 1, the cover sections 1 are designed as equilateral triangles, whereas according to FIG. 2, the cover sections 1a are of rectangular shape. The corner points of the sections 1 and 1a are beveled to provide spaces at the points of intersection of the sides and are respectively connected to each other at nodes or junctions 2 and 2a respectively by connecting means which permit a connection which is practically independent of the unevenness of the ground surface or slight deformations of the cover sections.

FIG. 3 shows a cover section 1b which has an undulated profile providing raised and depressed surfaces. The undulated shape of the plate profile is formed by adjacent trapezoidal portions. In between the crests or elevations 3 and the valleys or depressions 4 within the area of the neutral axis where the material contributes only immaterially to the strength, perforations 5 are provided. These perforations 5 permit influencing the static pressure fields above and below the cover section 1 inasmuch as an underpressure in the top side of the plate or an overpressure on the bottom side of the plate equalizes itself with regard to the respective other plate side. The customary earth anchors become superfluous, and the ground cover sections can, therefore, be employed in a train which would not permit the employment of earth anchors. Inasmuch as the cover sections 1b should also protect the underground against the direct influence of the jets, the perforations 5 are so arranged that the jets of the driving mechanisms reach the under-side of the plates only by detours.

Figure 6:
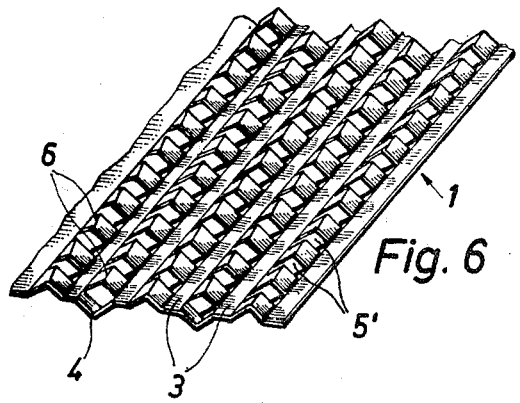

FIGS. 4–6 illustrate further embodiments of the cover sections. These cover sections 1c are provided with bridge-shaped elevations or raised surfaces 6 formed out of the valleys 4. Furthermore, the elevations 6 of adjacent valleys 4 are offset with regard to each other for reasons of strength. The profile according to FIG. 4 consists of a combination of adjacent circular arches and straight connecting webs, whereas according to FIG. 5 trapezoidal-shaped portions are arranged adjacent to each other. According to the embodiment of FIG. 6, the plate profile consists of a combination of triangles and straight web connections.

With these embodiments, due to elevations 6c, 6d and 6e, perforations 5', 5" and 5''' are formed which interconnect the top and bottom sides of the cover sections 1c, 1d and 1e. Since the direction of the axis of the perforations is approximately parallel to the extension of the surface of the cover sections 1e, 1d, 1e when viewed from the top, a close surface is obtained which protects the underground against the direct effect of the jet of the driving mechanism.

Figure 7:
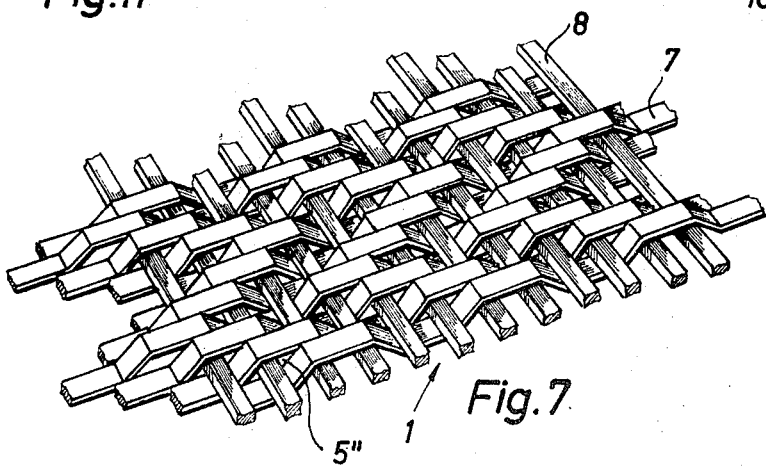
FIG. 7 shows a ground cover according to the invention built up from strips or bars.

FIG. 7 shows a further embodiment of a ground cover according to the invention. More specifically, according to FIG. 7 the ground cover section 1f is formed of strips or bars 7 and 8 which in this particular embodiment have a rectangular cross-section. The strips 7 have an undulated shape formed of adjacent trapezoidal parts. These bars or strips 7 are, when forming a cover section 1f, arranged adjacent to each other and offset with regard to each other. Through the thus obtained openings are passed the bars 8 in a direction perpendicular to the longitudinal extension of the bars 7 in the manner of the warp and weft of a fabric. The trapezoidal legs of the bar 7 are arranged between two bars 8 and in view of the offset arrangement of the bar 7 form lateral perforations 5'''', which permit the pressure equalization between the top and bottom side of the cover section 1f and also bring about a decrease in the occurring energy by deviation. Each cover section 1f will, in view of the arrangement of the bars 7 and 8, form a closed surface when viewed from the top, whereby a destruction of the ground by impacting jets will be avoided. The ratio between the magnitude of this surface and the total of the surface size of all perforations 5'''', will be determined by the height of the bars 8 and their spacing from each other as well as by the width of the bars 7.

Figure 8:
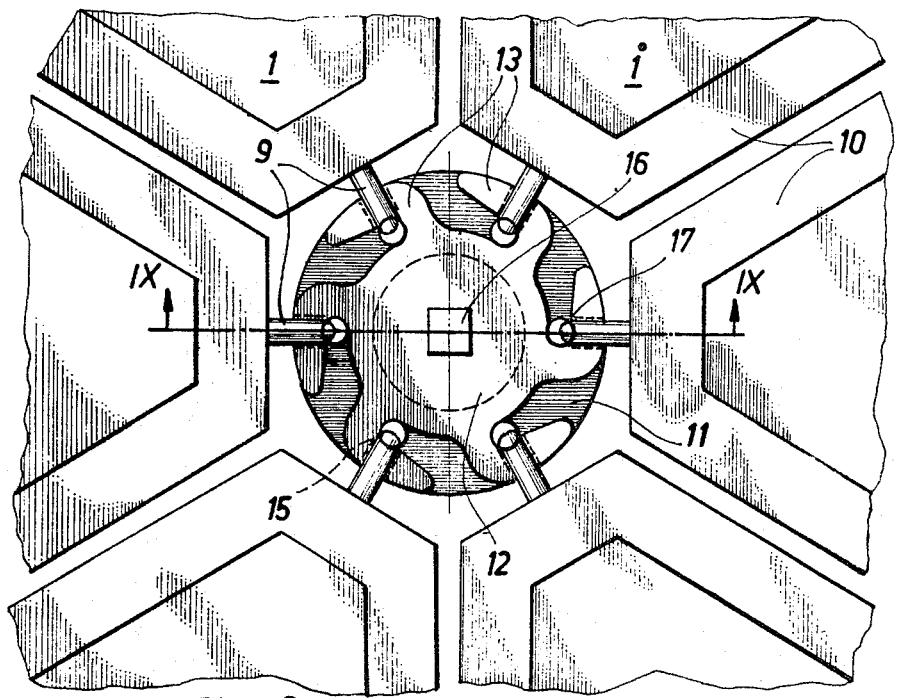
FIG. 8 shows a connecting member between the individual ground cover elements with connecting means in the form of hooks.
Figure 9:
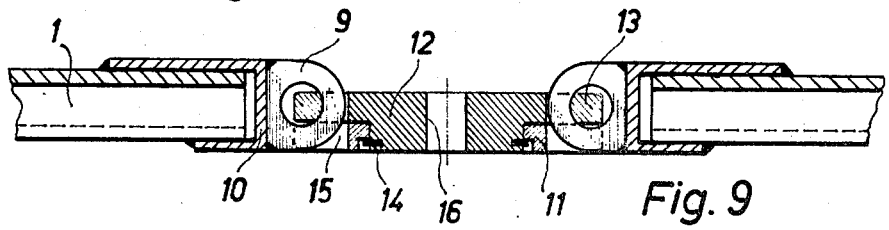
FIG. 9 is a section taken along the line IX—IX of FIG. 8.

The individual cover sections are interconnected at each point of intersection or junction 2, 2a (see FIGS. 1 and 2) by connecting means. To this end, according to the embodiment shown in FIGS. 8 and 9, the individual cover sections are at their corners provided with eyes 9. The cover sections are furthermore surrounded by U-shaped profiles or channel frames 10 for facilitating the handling thereof. The connecting means arranged in the node consists primarily of a base disc 11 and a cover disc 12 superimposed upon said disc 11 and rotatable relative thereto. The circumference of the cover disc 12 is provided with hooks 13 which engage the eyes 9 of the cover section when turning the cover disc 12. The base disc 11 is, through a snap ring 14, coupled to the cover disc 12 and has its outer marginal area provided with cutouts 15 into which the individual cover sections 1–1f are inserted with their eyes 9. In this connection the cover disc 12 with its hooks 13 is turned relative to the base disc 11 to such an extent that the cutouts 15 are freed. When the cover sections 1–1f are properly arranged, in other words, their eyes 9 are inserted into the cutouts 15, the cover discs 12 are turned into the position shown in FIG. 8. To this end, the cover discs 12 have a passage 16 into which a wrench can be introduced for turning said disc. Due to this turning movement, the hooks 13 slide into the plate eyes 9 until a thickened portion 17 of the hook passes the eye 9. Thus, by means of one turning movement, all ground cover sections meeting at a node or junction are latched to each other. The unlatching is, of course, effected in an inverse manner.

The arresting of the cover disc 12 in latched condition is effected by the shape of the hook 13 and the number of the hooks 13 and plate eyes 9. Should it become necessary for any reason, an earth anchor could be knocked through the passage 16 of the cover disc 12. If the upper shank of the earth anchor is designed so as to form a counterpiece to the passage 16, the earth anchor would be an additional safety feature against turning of the cover disc 12.

Figure 10:
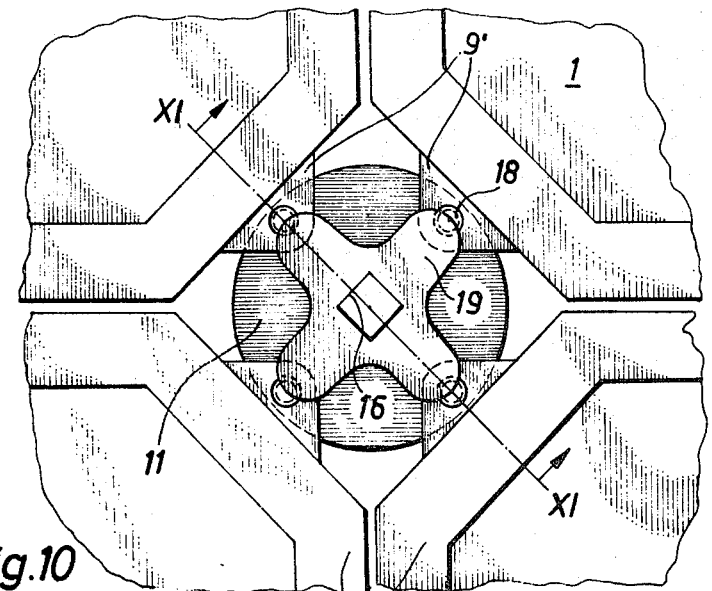
FIG. 10 is a connecting element according to another modification with the connecting elements in the form of pivots.
Figure 11:
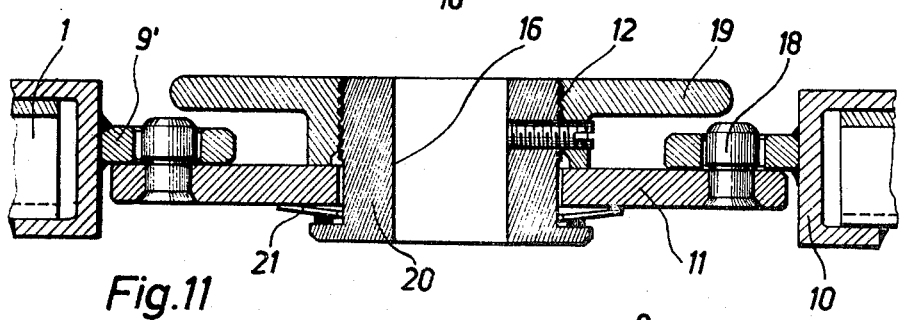
FIG. 11 represents a section taken along the line XI—XI of FIG. 10 but on a larger scale than the latter.

In FIGS. 10 and 11, a connecting part of a different embodiment is shown. The cover sections 1–1f differ from the embodiment of FIGS. 8 and 9 in that their eyes 9' are turned by 90° while the base disc 11a is provided with pivots 18 on which are suspended the individual cover sections 1–1f with their eyes 9' during the assembly. The latching will also in this instance be effected by turning the cover disc 12 relative to the base disc 11, and more specifically, one of the cover plates 19 slides over each pivot 18 and the eye 9' suspended thereon and prevents the disengagement of the eyes 9 (FIG. 10).

With this embodiment, the base disc 11a is through a shaft 20 connected to the cover disc 12. An accidental turning between the cover disc 12 and base disc 11a is prevented due to the fact that both discs are pressed against each other by a prelatched spring element 21.

In the embodiments of the cover according to the present invention, the connecting element with the hooks 13 is illustrated in connection with triangular cover sections, while the connecting section with the pivot 19 shows rectangular cover sections. It is obvious that both embodiments of the connecting parts can also be arranged in an inverse manner and employed with other forms of the cover sections.

It is furthermore to be understood that the present invention is, by no means, limited to the particular constructions shown in the drawings, but also comprises any modifications within the scope of the invention.

What we claim is:

1. Portable ground cover means composed of movable auxiliary sections for take-off and landing strips for vertical short take-off and landing aircraft, in which the sections making up said cover means have elevations and depressions and comprise passage-forming means interconnecting the top and bottom surfaces of said section for pressure equalization and to relieve formation of any pressure cushion underneath the same, said sections being of polygonal shape and being so arranged as to form junctions with each other, said movable auxiliary sections being formed by indestructibly interlocked corrugated plates with alternate valleys and crests, connecting means tightly interconnecting said sections against vertical high pressure particularly from vertical short take-off and landing aircraft at said junctions and including meander-shaped bars arranged adjacent to each other in one direction and offset with regard to each other in a direction transverse to said first mentioned direction so as to form passages extending in said first mentioned direction, and substantially straight bars extending through said passages in said second direction to thereby form a complementary structure of assembled interfit similar to a fabric in which said meander-shaped bars and said straight bars are arranged similar to the complementary warps and wefts of a fabric.

2. Portable ground cover means composed of movable auxiliary sections for take-off and landing strips for vertical short take-off and landing strips for vertical short take-off and landing aircraft, in which the sections making up said cover means have elevations and depressions and comprise passage-forming means establishing abated indirectly diverted axes of communication between the top and bottom surfaces of said section for pressure equalization and to relieve formation of any pressure cushion underneath the same, said sections being of polygonal shape and being so arranged as to form cooperatively interfitted linking junctions at intersections complementary with each other, and connecting means arranged complementary at said junctions for interconnecting with respect to a plurality of movable auxiliary sections, said connecting means comprising a rotatable member, said sections at said junctions being provided with means adapted to be engaged and locked tightly by said connecting means only in response to a limited rotative movement of said rotatable member, and interconnecting said sections against vertical high pressure gaseous stream particularly from vertical short take-off and landing aircraft exhausted at said junctions, said connecting means comprising a base disk with said rotatable member journalled on said base disk.

3. Portable ground cover means according to claim 2, in which said cover disc has means forming a centrally arranged profiled passage for selectively and interchangeably receiving a tool and an earth anchor each complementary thereto.

4. Portable ground cover means according to claim 2, in which said cover disc has means forming a centrally arranged profiled passage, and which comprises an earth anchor in complementary mating engagement through said passage in said cover disc for preventing the latter from rotation.

5. Portable ground cover means for take-off and landing strips for vertical and short take-off and landing aircraft, comprising a plurality of sections in the form of polygonal plates each having vertically spaced alternately raised and depressed surfaces adapted to rest on the ground and provide ground-engaging and runway-forming surfaces on the opposite sides of said plate with integral connecting portions extending between said surfaces to support the runway-forming surfaces on the ground-engaging surfaces, said runway-forming surfaces being laterally spaced with lateral passages through said connecting portions communicating with the space above and below said runway-forming surfaces to equalize the pressure above and below the plate and prevent a high velocity gaseous stream lifting said plate off the ground, the horizontal area of said surfaces and connecting portions being equal to the total horizontal area of the plate so that no vertical openings are present and the ground under the plate is shielded from the effect of a high velocity gaseous stream directed on to said plate, said sections being arranged in rows both longitudinally and transversely with their sides adjoining and along lines intersecting at points each of which is surrounded by adjoining sections, and separable connector means between the adjoining sections at each point of intersection comprising connector elements detachably connecting all the sections surrounding said point to allow limited angular movement of each section to conform to the ground and prevent separate upward movement of each section, said connector means comprising a first connector member between the sections and a second connecting portion adjoining each point of intersection on each section, said first connector member having further cooperating connector parts which individually engage said second connecting portions respectively on said sections adjoining the point of intersection.

6. Portable ground cover means as claimed in claim 5, in which each of said sections has its corners beveled so that a space is left between the sections surrounding each point and said first connector member is positioned in said space.

7. Portable ground cover means as claimed in claim 6, in which said raised and depressed surfaces are formed by valleys and crests of corrugations of said plates.

8. Portable ground cover means as claimed in claim 6, in which said sections are composed of glass fiber reinforced synthetic material.

9. Portable ground cover means as claimed in claim 6, in which said first connector member has a limited rotation to interengage the connector elements on said member and said adjoining sections.

10. Portable ground cover means as claimed in claim 6, in which each section has a frame fixed to its periphery and said connector elements on each section are fixed to said frame.

11. Portable ground cover means as claimed in claim 7, in which said frame member is channel-shaped in cross section, and the edges of said section are received within said channel.

References Cited

UNITED STATES PATENTS

| | | | |
|---|---|---|---|
| 422,318 | 2/1890 | Sagendorph | 52—674 |
| 514,313 | 2/1894 | Eckstein | 52—674 |
| 973,815 | 10/1910 | Robinson | 52—674 |
| 2,266,178 | 12/1941 | Dubois | 94—13 |
| 2,344,131 | 3/1944 | Coryell | 94—13 |
| 2,353,398 | 7/1944 | Greulich | 94—13 |
| 2,736,248 | 2/1956 | Greulich | 94—13 |
| 2,934,934 | 5/1960 | Berliner | 52—674 XR |
| 3,256,785 | 6/1966 | Stammbach et al. | 94—13 |

FOREIGN PATENTS

| | | |
|---|---|---|
| 692,966 | 6/1953 | Great Britain. |
| 855,056 | 2/1940 | France. |

JACOB L. NACKENOFF, Primary Examiner